United States Patent [19]

Sparks et al.

[11] Patent Number: 5,355,469
[45] Date of Patent: Oct. 11, 1994

[54] METHOD FOR DETECTING PROGRAM ERRORS

[75] Inventors: Clyde R. Sparks, Riverside; Romuald I. Scibor-Marchocki, Baldwin Park, both of Calif.

[73] Assignee: Delphi Data, a division of Sparks Industries, Inc., Corona, Calif.

[21] Appl. No.: 561,014

[22] Filed: Jul. 30, 1990

[51] Int. Cl.$^5$ ............................................. G06F 11/34
[52] U.S. Cl. ................................. 395/575; 364/264.1; 364/DIG. 1
[58] Field of Search ....................... 371/19, 15.1, 16.1, 371/21.1, 67.1, 68.3, 21.2, 12; 364/264.1; 395/575

[56] References Cited

U.S. PATENT DOCUMENTS

| | | | |
|---|---|---|---|
| 3,715,573 | 2/1973 | Vogelsberg | 235/153 AC |
| 3,763,474 | 10/1973 | Freeman et al. | 340/172.5 |
| 4,156,918 | 5/1979 | Olander, Jr. et al. | 364/706 |
| 4,166,290 | 8/1979 | Furtman et al. | 364/200 |
| 4,429,368 | 1/1984 | Kurii | 371/19 |
| 4,453,210 | 6/1984 | Suzuki et al. | 364/200 |
| 4,598,364 | 7/1986 | Gum et al. | 371/19 |
| 4,748,625 | 5/1988 | Krause et al. | 371/22 |
| 4,755,995 | 7/1988 | Anderson et al. | 371/19 |
| 4,763,244 | 8/1988 | Moyer et al. | 395/400 |
| 4,783,762 | 11/1988 | Inoue et al. | 371/19 |
| 4,802,085 | 1/1989 | Levy et al. | 364/200 |
| 4,823,307 | 4/1989 | Melgara et al. | 371/19 |
| 4,890,223 | 12/1989 | Cruess et al. | 364/200 |
| 5,193,178 | 3/1993 | Chillarge et al. | 395/575 |

FOREIGN PATENT DOCUMENTS 0080197 5/1983 Japan ....................... 371/19
0862144 9/1981 U.S.S.R. ................... 371/19

OTHER PUBLICATIONS

"Advanced Microprocessor Architectures" by Ciminiera et al, 1987, pp. 259–280.
"Storage Protection Mechanism for Processor" by Martinez, IBM Corp. 1980 pp. 4369–4371.
"Microcoded Detection of a Program Violation" by Favre et al., IBM Corp. 1979, pp. 4564–4565.
Cy Ramamoorthy et al., "Design and Construction of an Automated Software Evaluation system" Rec. 1973 IEEE Symp. Software Deliability pp. 28–37.
John L. Nichols, "The Bug Stop Here by Building a Simple Hardware Circuit and Adding Software Labels, Designers Can Create an Automatic Code-Debugging System" Jan. 26, 1989, pp. 84–90.

*Primary Examiner*—Robert W. Beausoliel, Jr.
*Assistant Examiner*—Phung My Chung
*Attorney, Agent, or Firm*—Spensley, Horn, Jubas & Lubitz

[57] ABSTRACT

A method of automatically detecting errors in computer program caused by erroneous memory allocations and deallocations, flawed logic structure, and/or hardware malfunctions. The inventive method uses a predefined first table structure to monitor all data storage allocations and deallocations of a computer program. Another aspect of the invention is the use of a second table to track existing memory allocations that are not properly deallocated at the end of a program. The invention also includes a method for detecting program errors that inadvertently overwrite memory locations whose values should remain constant during the execution of a program.

9 Claims, 3 Drawing Sheets

STEP 100 Build a Free Table with RED_INITIALIZE

STEP 105 Optionally, build a Hanging Name Table with RED_INITIALIZE and enter hanging names identified in Step 150 during a previous execution of the program STEP 110 For each call to a RED command that allocates memory to a variable, apply allocation validation tests, including examination of the Free Table STEP 112 If hanging names are entered in the Hanging Name Table, when a memory allocation is requested, compare the requested variable to the Hanging Name Table STEP 113 If the variable name location of an allocation request matches a hanging name in the Hanging Name Table, generate an error message, and go to Step 155

STEP 115 If an allocation request fails an allocation validation test, generate an error message, and go to Step 155

STEP 120 If an allocation request does not fail the allocation validation tests, then enter the variable name location, variable name, and variable size for the pending memory allocation request into the Free Table, and grant allocation of the memory STEP 125 Allocate the requested memory to the variable STEP 130 For each call to a RED command that deallocates memory allocated to a variable, apply deallocation validation tests, including examination of the Free Table STEP 135 If a deallocation request fails a deallocation validation test, generate an error message, and go to Step 155

STEP 140 If a deallocation request does not fail the deallocation validation tests, then delete the Free Table entry corresponding to the pending memory deallocation request, and grant the deallocation request STEP 145 Deallocate the variable STEP 150 If the RED_TERMINATION command is called, identify and output any entries in the Free Table that have not been deleted from the table STEP 155 (a) If a RED command generates an error message, halt execution of the program
or
(b) Alternatively, pass error messages to an error message monitor process for user-defined response STEP 100 Build a Free Table with RED_INITIALIZE STEP 105 Optionally, build a Hanging Name Table with RED_INITIALIZE and enter hanging names identified in Step 150 during a previous execution of the program STEP 110 For each call to a RED command that allocates memory to a variable, apply allocation validation tests, including examination of the Free Table STEP 112 If hanging names are entered in the Hanging Name Table, when a memory allocation is requested, compare the requested variable to the Hanging Name Table STEP 113 If the variable name location of an allocation request matches a hanging name in the Hanging Name Table, generate an error message, and go to Step 155

STEP 115 If an allocation request fails an allocation validation test, generate an error message, and go to Step 155

STEP 120 If an allocation request does not fail the allocation validation tests, then enter the variable name location, variable name, and variable size for the pending memory allocation request into the Free Table, and grant allocation of the memory STEP 125 Allocate the requested memory to the variable STEP 130 For each call to a RED command that deallocates memory allocated to a variable, apply deallocation validation tests, including examination of the Free Table STEP 135 If a deallocation request fails a deallocation validation test, generate an error message, and go to Step 155

STEP 140 If a deallocation request does not fail the deallocation validation tests, then delete the Free Table entry corresponding to the pending memory deallocation request, and grant the deallocation request STEP 145 Deallocate the variable STEP 150 If the RED_TERMINATION command is called, identify and output any entries in the Free Table that have not been deleted from the table STEP 155 (a) If a RED command generates an error message, halt execution of the program
        or
    (b) Alternatively, pass error messages to an error message monitor process for user-defined response

FIG. 2

STEP 200 During the execution of the RED_INITIALIZE command, copy the Context to a reserved space STEP 210 At defined times, compare the preserved Context to the current contents of the original memory locations copied STEP 220 If a change has occurred, generate an error message, and go to Step 155

STEP 230 Otherwise, continue processing

FIG. 3

METHOD FOR DETECTING PROGRAM ERRORS

BACKGROUND OF THE INVENTION

1. Field of the Invention

This invention relates to a method of automatically detecting errors in computer programs, and more particularly to detecting errors in computer program caused by erroneous memory allocations and deallocations, flawed logic structure, and/or hardware malfunctions.

2. Description of Related Art

Computer programs, or "software", have become an increasingly important component of modern technology. General purpose computers, when specifically programmed, become special purpose machines for accomplishing a wide variety of functions, from word processing to real-time guidance control in aircraft and missiles.

Errors (or "bugs") in computer programs cause programs to malfunction in a variety of ways, with a wide range of unintended results, from annoying to disastrous. As computer programs have become more complex, "debugging" computer programs to eliminate such errors has become increasingly difficult, and has required an increasingly large percentage of program developer resources. Indeed, a sub-industry has developed in the field of computer programs specially designed to ease the burden of detecting, locating, and remedying program errors. Examples of such commercial products are Microsoft Corporation's "CODE-VIEW" debugging program and Borland International Inc.'s "TURBO DEBUGGER" program.

While such debugging programs have made error detection and correction somewhat easier for computer programmers, one disadvantage of such programs is that they do not monitor a program in an operational setting after the program has been released for commercial use. That is, such debugging tools are generally limited to use only during program development.

A common source of program errors in complex software relates to dynamic allocation and deallocation of computer memory. The memory of a computer represents a finite resource, which must be carefully conserved. Memory space is divided into program code space, the "stack", and the "heap". The stack is a fixed-size memory block used for variables and defined by a compiler during compilation of a program. The "heap" is computer memory space outside of the program code space and the stack. The heap must be dynamically allocated and deallocated.

Large, complex programs, if loaded all at once, or by working with large data files, would normally exceed the memory resources of a typical computer. However, since not all program functions are generally needed at one time, and since large data files can usually be processed in segments, most large, complex programs dynamically allocate available memory resources depending upon the nature and requirements of each function. For example, a word processing program that has a spell checking capability does not normally need to maintain the spell checking program code in memory at all times. When the spell checking function is invoked by a user, memory currently in use by a portion of the program that is not needed during the spell checking routines may be deallocated, and that memory reallocated to the spell checking code and data. The same concept applies when working with complex data structures and large data files.

Dynamic allocation and deallocation of the heap permits a programmer to manage the memory needs of a large program. A number of computer program languages are particularly well suited to such dynamic memory allocation and deallocation. One example is the C language, widely used in a large number of programs. The principal command used in the C language to allocate a portion of memory is MALLOC (for "Memory ALLOCation"), and the principal command to deallocate memory is "FREE". Variations of these commands are known in the art, and are used with different programming "memory models".

Most languages that support dynamic memory allocation use "pointers" extensively (and sometimes exclusively) to track and access allocated blocks of memory. A pointer is a location in memory, generally given a name for ease of reference, which contains an address that "points" to an allocated memory block. Thus, a pointer is an indirect method of addressing a memory block.

A problem that frequently arises in programs that use dynamic memory allocation is misallocation of a memory block, or misuse of a pointer. For example, if a block of memory is allocated in a fashion that overlaps memory locations that are already in use, an error is likely to occur during operation. As another example, if the value of a pointer is inadvertently changed, and thereafter that pointer is used to access what is believed to be a correctly designated memory block, some other portion of memory will instead be accessed, generally causing a serious error. Such errors are also symptomatic of flaws in the logical structure of a computer program, since often the decision to make a dynamic memory allocation or deallocation is dependent on the logical structure of the program.

Because of the complexities of many programs, such errors are often undetected until a particular sequence of program code is executed, or a particular data event occurs, or a particular sequence of memory allocation, deallocation, and/or reference occurs. Further, due to the indirect referencing capabilities of pointer-intensive programs, it is possible for an error in one part of a program to cause error symptoms to appear in another, non-erroneous part of the program, thus making debugging very difficult. Moreover, the problem is compounded by the fact that certain types of hardware malfunctions—particularly intermittent errors—can cause a program to appear to have errors in logical structure.

Generally, it is almost impossible to simulate all possible program code combinations in developing computer software, and thus it is virtually impossible to detect all error conditions. Therefore, it is well known in the industry that most computer programs commercially available are sold with bugs in them, the occurrence of which may not be known for weeks, months, or even years after the programs are released.

Therefore, it is desirable to have a means for automatically detecting memory allocation and deallocation errors, and errors in the logical structure of a computer program. Moreover, it is desirable to have such a means which can be incorporated into software such that the error detecting function would continue to detect, or "trap", errors in an operational environment, rather than only in a development environment. It is also desirable to find errors caused or evidenced by bad memory allocations and deallocations or hardware malfunctions before the errors occur.

The present invention meets these goals.

SUMMARY OF THE INVENTION

The present invention provides a means to find program errors before the errors occur. This purpose is accomplished by automatically tracking each dynamic memory allocation and deallocation made by a computer program, and actively "trapping" operational errors caused by erroneous memory allocations or deallocations, flawed logic structure, and/or hardware malfunctions.

The inventive method uses a pre-defined first table structure to monitor all data storage allocations and deallocations of a computer program. For each allocation request, a check is made as to whether the request passes certain validity checks and does not conflict with an existing allocation in the table structure. If no verification problem exists, an entry is made in the first table for the pending allocation request, and processing continues in a normal fashion. If a pending memory allocation violates a validity check or conflicts with an existing allocation, an error message is generated.

For each deallocation request, a check is made as to whether the request passes certain validity checks and a search of the first table is made to verify if a previous allocation has been made. If the request is valid, the corresponding entry in the first table is deleted, and processing continues in a normal fashion. Otherwise, an error message is generated.

Another aspect of the inventive method is the use of a second table (or subset of the first table) to track existing memory allocations that are not properly deallocated at the end of a program. Examination of the first table at the end of a program (or subprogram, if a separate first table is created for the subprogram is created) will determine if any entries remain in the first table. If entries exist, indicating memory allocations which have not been properly deallocated, information related to the misallocated memory is output to the user or stored in a data file. Thereafter, some or all of the memory misallocation information in the second table may be entered by the user, or automatically loaded from the stored data file. During subsequent operation of the program, when memory allocations are requested, the second table is also examined. If a memory allocation request matches an item in the second table, an error message is generated indicating that the source of the error is the pending memory allocation request.

In all cases, error messages may be directed to a programmer, or to another computer process for automatic handling of memory allocation/deallocation errors.

The invention also includes a method for detecting program errors or hardware malfunctions that inadvertently overwrite memory locations whose values should remain constant during the execution of a program (e.g., areas of memory that contain program code rather than variables). This is accomplished by initially saving the contents of a portion of critical memory storage, and then periodically comparing the current contents of the critical memory storage with the previously saved contents. If any change exists, an error has occurred.

The preferred embodiment of the invention is implemented as a set of computer program subroutines which are counterparts of, and substituted for, standard memory allocation and deallocation subroutines.

The details of the preferred embodiment of the present invention are set forth below. Once the details of the invention are known, numerous additional innovations and changes will become obvious to one skilled in the art.

DESCRIPTION OF THE DRAWINGS

FIG. 2 is a flow chart of the preferred embodiment of the memory allocation/deallocation functions performed by the present invention.

FIG. 3 is a flow chart of the preferred embodiment of the context comparison function performed by the present invention.

DETAILED DESCRIPTION OF THE INVENTION

Figure 1:
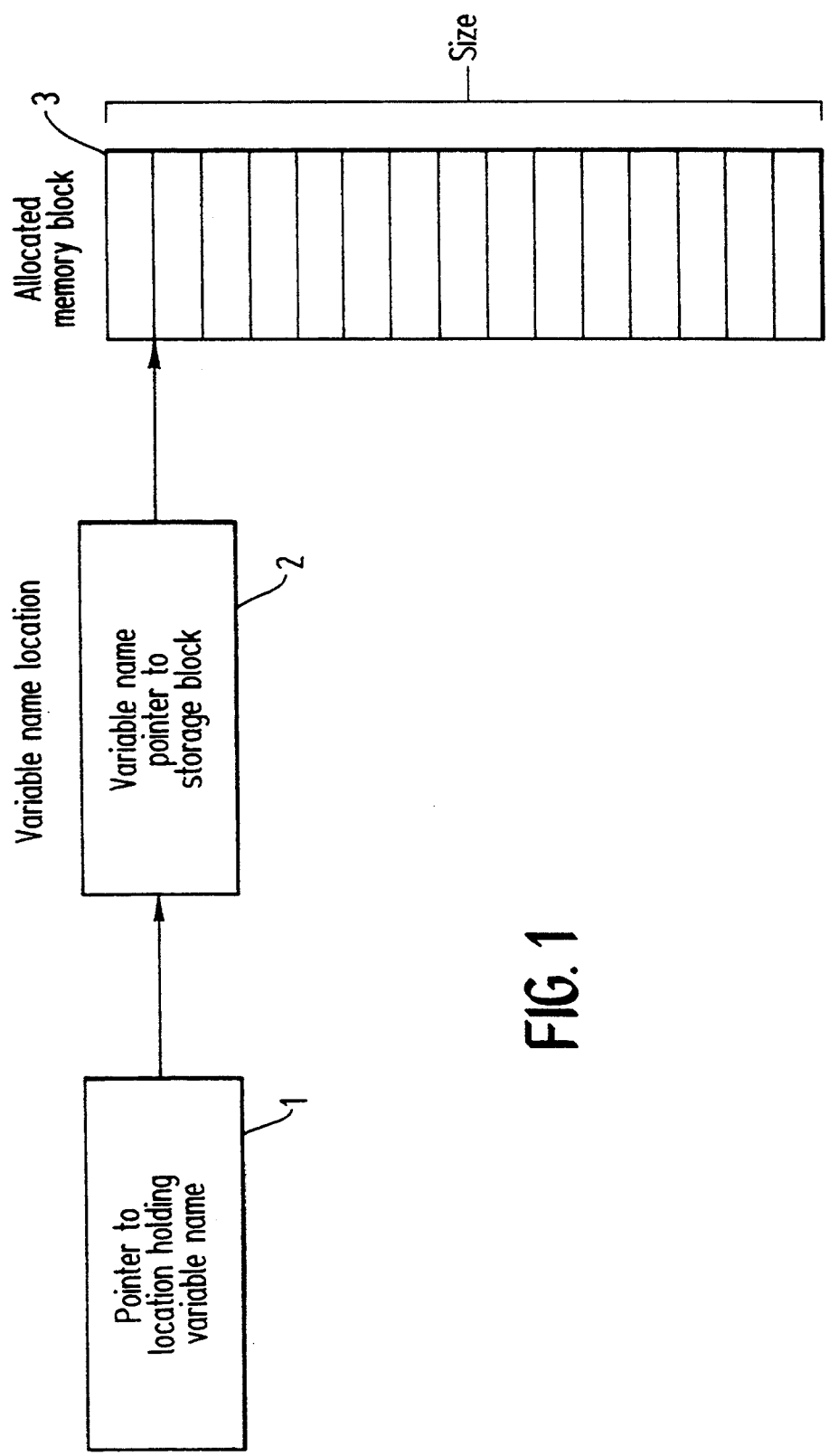
FIG. 1 is a block diagram of the relationship between a variable name location pointer, a variable name location and associated variable name pointer, and the data structure of a variable.

Throughout this description, the preferred embodiment and examples shown should be considered as exemplars, rather than limitations on the method of the present invention. For example, although the following discussion is presented in the context of use with the C programming language, the inventive concepts can be readily applied to any computer language that provides for dynamic memory allocation and deallocation.

The inventive method monitors all of the data storage allocations and deallocations of a computer program, and notifies the programmer (or another computer process, for automatic handling of memory allocation/deallocation errors) of any inconsistencies.

The invention comprises a set of computer program subroutines which are counterparts of, and substituted for, standard memory allocation and deallocation subroutines. For example, if a computer program written in the C language would normally call the MALLOC command, in the preferred embodiment of the present invention, a RED_MALLOC (for Real-time Error Detection Memory ALLOCation) command would instead be called. Similarly, if the program would normally call the FREE command, under the present invention the program would instead call a RED_FREE command.

The present invention builds a table that stores information relating to a variable. Information that is relevant about a variable includes: (1) the variable name location (which is a pointer to a variable location in memory that stores a pointer value—the variable name—that in turn points to the initial memory location of an allocated memory block assigned to the variable name); (2) the variable name (which is a pointer value stored in the variable name location and which points to the initial memory location of an allocated memory block assigned to the variable name); (3) the initial location of the memory block assigned to the variable; and (4) the size of the memory block pointed to by the variable name. The relationship between a variable name location pointer 1, a variable name location and associated variable name pointer 2, and the memory block 3 assigned to a variable is shown in FIG. 1.

Shown in FIG. 2 is a flow chart of a typical method of using the present invention. In Step 100, a Real-time Error Detection (RED) "Free Table" is built, with a pre-allocated memory size. The table is built by a user's program invoking an initialization routine called RED_INITIALIZE, preferably before the user's program allocates other storage (although a separate Free Table can be built for each subprogram). The Free Table can be structured as a three-column table containing: (1) a variable name location; (2) a corresponding variable name; and (3) the size of the variable block pointed to by the variable name.

In some languages, such as Microsoft C, the size of a variable is stored in the memory block reserved for the variable data, and thus could be obtained by examination of the memory block pointed to by the variable name. Therefore, the size information need not be physically recorded in the Free Table, since the size information stored in the variable data memory block can be considered to be part of a "logical" Free Table.

Further, the variable name need not be physically recorded in the Free Table, because each variable name value can be obtained by using the corresponding variable name location pointer to access the variable name location and read the pointer value stored therein. Thus, the variable name so accessed can be considered to be part of a "logical" Free Table.

Thus, for example, if a variable "X" is allocated having a size of 64 bytes, the Free Table would contain (1) a variable name location value, which is associated with the variable "X" and points to the location in memory of the variable name; (2) a variable name, which is a pointer value which points to the initial memory location of the memory block assigned to the variable "X"; and (3) the size of the variable (64 bytes). Generation of such a table structure (whether as a physical three column table or as a logical table using variable name location pointers to access the corresponding variable names and variable sizes) is well-known in the art. Optionally, the RED_INITIALIZE routine builds a Hanging Name Table (Step 105), which can be structured as a single column containing variable name locations identified by the RED_TERMINATION command (as described below). Alternatively, the Hanging Name Table can be structured as an extension of the Free Table by adding a flag to each table entry to indicate whether or not the entry contains a Hanging Name. Generation of either type of table is well-known in the art.

The purpose of the Hanging Name Table is to trap errors due to failure to deallocate variables. When a user's program is finished using a particular block of memory, the program should deallocate that memory block, thereby deleting the name of the memory block from the Free Table. However, one source of program error occurs when a user's program fails to properly deallocate memory blocks, thus leaving the names of those memory blocks "hanging" in the Free Table. Finding where such memory blocks have been allocated is sometimes impossible, since the termination of a program generally releases all of the storage space used by the program; no valid information about the contents of the memory remains for a developer to examine. The Hanging Name Table provides a means for tracking memory blocks that have not been properly allocated, as described more fully below in discussing the RED_TERMINATION command.

The size of the Free Table is set by the user to be the maximum number of concurrent memory allocations (and, optionally, hanging names) required by a program. The entries in the Free Table are "reusable", in the sense that if a memory block that has been allocated is later freed, the entry in the Free Table that had been used to track that memory block is made available for reuse for a subsequent memory allocation. The size of the Hanging Table (if separately structured) is set by the user to be the maximum number of hanging names to be "trapped".

After the RED tables are created by the RED_INITIALIZE command, a user simply replaces the standard memory allocation and deallocation commands normally used by the programmer (such as are commonly available within the C language), with like-named counterpart commands having the prefix "RED_", which indicates that the counterpart commands embodying the present invention are being called, rather than the standard commands. One important difference in the RED commands is that a variable name location as well as the variable name are passed as a parameter to the programs implementing the RED commands. The variable name location, which is not passed as a parameter of the standard commands, is important for maintaining the Free Table and validating allocation and deallocation requests against the Free Table. Once a programmer defines a variable, the standard compiler provides values for the variable name location and variable name pointer automatically.

During the execution of the user's program, each time the user calls a RED command that allocates memory to a variable, the program routine implementing that RED command first applies a number of different rules to validate each allocation request, including examining the Free Table (Step 110). If a test is failed, an error message is generated (Step 115). In the preferred embodiment, the invention performs the following checking for each memory allocation request:

1. The variable name location of the pending allocation request is checked to see that the variable name location has not been set to NULL. In most programming languages, such as the C language, a variable must be explicitly declared. Thereafter, good programming practice is to set the variable name to NULL, meaning that the variable name initially points to the zero address of memory space available to the program before a block of memory is assigned to the variable. (:In the preferred embodiment of the invention, a programmer must set a variable name to NULL for proper Context checking, as described below). This test checks whether the programmer has inadvertently set the variable name location, rather than the variable name, to NULL. If the variable name location is set to NULL, allocating storage space to the variable will write a pointer value into the zero address location, thus corrupting the lower memory locations (which normally are not used for variable allocation). If the variable name location is NULL, an error message is generated.

2. In the preferred embodiment, the variable name is checked to see that its value is NULL. In the preferred embodiment of the invention, when a variable is defined or deallocated, the variable name must be set to NULL for proper Context checking, as described below. If the variable name is not NULL, an error message is generated.

3. The variable name location of the pending allocation request is compared to the variable name locations already in the Free Table. If the pending variable name location value points to the same variable name location as a previously existing allocation, then an error message is generated. If storage has been allocated to a variable, a particular location in memory—the variable name location for that variable—contains a pointer to the storage. If a programmer inadvertently tries to make another storage allocation to the same variable, the same variable name location would be altered to point to the new storage space. The previously allocated storage space would no longer be associated with any pointer to it, and thus could not be accessed or deallocated. This wastes space, and can eventually lead to an "out of memory" condition as multiple misallocations occur. This error condition cannot be determined from comparing the variable name values themselves (which is the only information available using standard commands), but only by comparing the values of the variable name locations.

4. If the size of the pending allocation request exceeds the available storage area, then an error message is generated.

5. If the Free Table becomes full, such that the pending allocation request cannot be entered into the Free Table, an error message is generated. On subsequent compilations of the program, the programmer can increase the size of the Free Table to accept more entries.

Other tests to verify the validity of the allocation of memory can be performed if desired. If none of the rules applied to the Free Table are violated, then the variable name location, variable name, and variable size for the pending memory allocation request are entered into the Free Table, and the memory allocation is granted (Step 120). The memory allocation itself, once approved, is performed in known fashion in the same way that the corresponding standard command would perform the function (Step 125). Indeed, in the preferred embodiment, the corresponding standard command is generally called by a RED command after a memory allocation has been approved in order to perform the actual memory allocation. For example, the RED_MALLOC command calls the MALLOC command from the user's standard library of program routines. Any error messages from the standard routine are generally passed by the calling RED command straight back to the user's program.

When a user's program no longer needs a block of allocated memory, good programming practice is to deallocate, or free, the block so that it can be reused in subsequent processes. Therefore, a programmer would use the RED_FREE command to free a particular allocated block of storage. For example, if a block of sixteen kilobytes of storage have been allocated to store, for example, an array of numbers, after the array is no longer required, the RED_FREE command should be called, identifying the array name. The inventive method then examines the Free Table and checks the validity of the deallocation command by performing a number of tests (Step 130). If a test is failed, an error message is generated (Step 135). In the preferred embodiment, the invention performs the following checking for each memory deallocation request:

1. The variable name location of the pending allocation request is checked to see that the variable name location has not been set to NULL. A NULL value for the variable name location indicates that the variable has not been properly allocated previously. If the value is NULL, then an error message is generated.

2. If the variable name is NULL, indicating that the variable has not been properly allocated previously, then an error message is generated.

3. If the variable name is not already in the Free Table, indicating that no storage had been allocated previously to that variable, then an error message is generated. Multiple deallocation of a variable would result in unpredictable operation of a program.

Other tests to verify the validity of the deallocation of memory can be performed if desired. If none of the rules applied to the Free Table are violated, then the Free Table entry corresponding to the pending memory deallocation request is deleted from the Free Table, and the deallocation is granted (Step 140). The memory deallocation itself, once approved, is performed in known fashion in the same way that the corresponding standard command would perform the function (Step 145). Again, in the preferred embodiment, the corresponding standard command is generally called by a RED command after a memory deallocation has been approved in order to perform the actual memory deallocation.

If a user invokes the RED_TERMINATION command at the end of the user's program code, the present invention examines the Free Table to identify any entries that have not been deleted from the table. Such entries indicate blocks of memory that were allocated but not properly deallocated by the user's program (Step 150). The RED_TERMINATION routine then outputs to the user (for example, via a printout, video screen display, or by writing to a data file) the variable name locations of the variables that were not deallocated. Some or all of the variable name locations of such variables may then be entered into the Hanging Name Table, either manually by the user, or by automatically reading the variable name locations from a previously written data file.

During subsequent operation of the program, when memory allocations are requested, the Hanging Name Table (which, as noted above, may comprise an extension of the Free Table) is examined for each request (Step 112). If the variable name location of a memory allocation request matches an item in the Hanging Name Table, an error message is generated indicating that the source of the error is the pending memory allocation request (Step 113). If desired, program execution can be stopped when a Hanging Name error message is generated, and a breakpoint set in memory, in known fashion. This permits a program developer to step back through the program code with a standard debugging program to the code line directly after the code line that attempted to allocate memory to a variable matching an entry in the Hanging Name Table.

Once a RED command generates an error message, execution of the program can be halted (Step 155(*a*)). Alternatively, particularly in a multitasking or multithreaded operating system environment (e.g., Microsoft Corporation's OS/2 operating system), some or all of the error messages can be detected by an error message monitor process (for example, via an interprocess communication), which can dynamically respond to such errors in a fashion defined by a user (Step 155(*b*)). For example, with certain types of errors, the error message monitor may restart a process rather than halt program execution completely.

In order to be fully compatible with the standard library of program commands which are replaced by the RED library of commands, other functions are emulated by corresponding RED library commands. Many of such commands involve an implicit allocation and/or deallocation of memory. For instance, a standard C programming language library command is REALLOC. This command is used to change the size of a previously allocated block of storage. The contents of the new block remains the same as the contents of the old block, up to the shorter of the old and new block sizes. For example, if a 1,000 byte block of storage has previously been allocated, the REALLOC command can be used to change the size of that block to 2,000 bytes. Since such a change could cause a conflict in memory locations, a RED_REALLOC command is used, which first examines the Free Table to ensure that the allocation of the new memory block will not conflict with any of the verification rules. If no conflict exists, then the reallocation function is performed in the same manner as the standard library command. In the preferred embodiment of the invention, similar counterpart commands exist for each of the standard commands, particularly those that implicitly allocate and/or deallocate memory space. Examples of such standard commands are STRCPY (string copy); STRDUP (string duplication); STRNCPY (copy "n" characters from string 1 to string 2); MEMCPY (copy bytes from a source string to a destination string); and MEMSET (set the first "n" bytes of a variable to a particular value).

The invention also includes a method for detecting program or hardware errors that inadvertently cause overwriting of memory locations whose values should remain constant during the execution of a program. Overwriting an undesired portion of memory is a leading cause of program errors. In the preferred embodiment, during the execution of the RED_INITIALIZE command, the information ("Context") in a defined amount of memory space beginning at address zero (relative to the program) is copied into a reserved space (Step 200 of FIG. 3), which may be in the memory of the computer, in a "virtual" memory swapped to a storage device, or as a data file on a storage device. An additional constraint is imposed on programmers: whenever a variable is defined by the programmer, the programmer must initialize the variable name to zero before any memory space is allocated to the variable or any data is stored in the variable.

For example, upon execution of the RED_INITIALIZE command, the first 1,000 bytes of memory space allocated to a program can be copied into a reserved location, since the lower memory locations of most programs do not generally hold variables. Thus, any change to these lower memory locations during program execution would constitute an error. These lower memory locations are candidates for corruption if a variable is identified and its variable name set to null (which is equivalent to the zero location in memory for a particular program), but not had memory space properly allocated to it. If the program attempts to store data in the variable, the data will be written at the zero location in memory (which is pointed to by the variable name), thus overwriting critical memory space. The detection of such an event informs a programmer that the variable causing the problem has not been properly used in the program, which is usually indicative of an error in the logical structure of the program or a hardware malfunction.

At convenient opportunities, the preserved Context is compared to the current contents of the original memory locations (Step 210). If a change has occurred, indicating that the original memory space has been overwritten, an error message is generated (Step 220), which may be further processed as described above (Step 155 of FIG. 2). Otherwise, processing continues in normal fashion (Step 230).

In the preferred embodiment of the invention, the Context checking function is conveniently performed during memory allocations and deallocations, i.e., when the Free Table is being examined for such allocations or deallocations (Step 110 and Step 130 of FIG. 2).

The present embodiment of the invention can be implemented in object code requiring less than ten kilobytes of memory usage, and typically using less than 1% of an application's central processing unit execution time. However, in the preferred embodiment of the invention, the error-checking functions of the RED commands may be disabled, in which case no validation of the RED commands is performed against the Free Table or the Hanging Name Table. Instead, the standard counterpart functions are performed by (or, alternatively, called by) the RED commands. Activating this option causes a reduction in the execution time overhead that such checking would otherwise entail. This enables a developer to use the RED commands only during development of a program, and then release the program with no performance penalty caused by such checking. For greater flexibility, in the preferred embodiment, individual categories of checking may be disabled (e.g., checking for alterations of memory compared to the preserved Context can be selectively disabled).

As noted above, the purpose of the invention is to find errors by checking for errors before the errors occur. The testing carried out by the present invention before a memory allocation or deallocation is permitted allows identification of errors in the logical structure of a program as well as some hardware malfunctions before the errors can cause damage during the execution of a program. The benefits of the present invention are such that it is advantageous for a programmer to make functions of a program depend on memory allocations to RED commands, as a way of testing the proper logical structure of the program. For example, if the logical structure of a program was designed to dynamically allocate memory after a certain event had occurred, but an allocation resulting in an error trapped by the RED commands is made before the event, a programmer is provided with important information about flaws in the program's logical structure. Indeed, by making most or all variables depend on dynamic memory allocation of a program's heap rather than using static allocation on the program's stack, the validity checking performed by the present invention is extended to cover more possible sources of error.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. A method of automatically detecting operational errors in execution of commands of a computer program in a computer by monitoring memory allocations, such commands being of the type that allocate memory for a variable, each variable having a name location, a name, and a size, comprising the steps of:

a. generating a logical table in the computer structured to store at least one entry comprising values for a variable name location, variable name, and variable size;

b. defining a set of allocation test conditions;

c. during execution in the computer of a command allocating a variable, comparing in the computer the variable name location, variable name, and variable size of the variable to the set of allocation test conditions, including comparison of the variable name location of the variable to the variable name location value of the at least one entry of the logical table;

d. if the variable fails any one of the set of allocation test conditions, then generating an error indication to the computer;

e. otherwise,
  (1) storing the variable name location, variable name, and variable size of the variable as an entry in the logical table; and
  (2) allocating the variable in the computer.

2. A method of automatically detecting operational errors in execution of commands of a computer program in a computer by monitoring memory deallocations, such commands being of the type that deallocate memory for a variable, each variable having a name location, a name, and a size, comprising the steps of:

a. generating a logical table in the computer structured to store at least one entry comprising values for a variable name location, variable name, and variable size;

b. storing entries in the logical table for allocated variables;

c. defining a set of deallocation test conditions;

d. during execution in the computer of a command deallocating a variable, comparing in the computer the variable name location and variable name of the variable to the set of deallocation test conditions, including comparison of the variable name location of the variable to the variable name location value of the at least one entry of the logical table;

e. if the variable fails any one of the set of deallocation test conditions, then generating an error indication to the computer;

f. otherwise,
  (1) deleting the entry in the logical table having a variable name location matching the variable name location of the variable; and
  (2) deallocating the variable in the computer.

3. A method of automatically detecting operational errors in execution of commands of a computer program in a computer by monitoring memory allocations and deallocations, such commands being of the type that allocate or deallocate memory for a variable, each variable having a name location, a name, and a size, comprising the steps of:

a. generating a logical table in the computer structured to store at least one entry comprising values for a variable name location, variable name, and variable size;

b. storing entries in the logical table for allocated variables;

c. deleting corresponding entries in the logical table for deallocated variables;

d. upon termination of a selected group of commands of the computer program, examining the logical table for any undeleted entries of allocated variables and storing the variable name location for such undeleted entries as hanging names for future recall;

e. before a subsequent execution of the computer program, entering selected ones of the hanging names into the logical table;

f. during subsequent execution of the computer program, upon execution of a command in the computer allocating a variable, comparing the variable name location of the variable to the hanging names in the logical table;

g. if the variable name location of the variable matches any of the hanging names in the logical table, then generating an error indication to the computer.

4. A programmed digital computer for automatically detecting operational errors in execution of commands of a computer program in the computer by monitoring memory allocations, such commands being of the type that allocate memory for a variable, each variable having a name location, a name, and a size, comprising:

a. means for generating a logical table in the computer structured to store at least one entry comprising values for a variable name location, variable name, and variable size;

b. means for comparing in the computer, during execution of a command allocating a variable, the variable name location, variable name, and variable size of the variable to a set of allocation test conditions, including comparison of the variable name location of the variable to the variable name location value of the at least one entry of the logical table;

c. means for generating an error indication to the computer if the variable fails any one of the set of allocation test conditions, and for otherwise storing the variable name location, variable name, and variable size of the variable as an entry in the logical table, and allocating the variable in the computer.

5. A programmed digital computer for automatically detecting operational errors in execution of commands of a computer program in the computer by monitoring memory deallocations, such commands being of the type that deallocate memory for a variable, each variable having a name location, a name, and a size, comprising:

a. means for generating a logical table in the computer structured to store at least one entry comprising values for a variable name location, variable name, and variable size;

b. means for storing entries in the logical table for allocated variables;

c. means for comparing in the computer, during execution of a command deallocating a variable, the variable name location and variable name of the variable to a set of deallocation test conditions, including comparison of the variable name location of the variable to the variable name location value of the at least one entry of the logical table;

d. means for generating an error indication to the computer if the variable fails any one of the set or deallocation test conditions, and for otherwise deleting the entry in the logical table having a variable name location matching the variable name location of the variable, and deallocating the variable.

6. A programmed digital computer for automatically detecting operational errors in execution of commands of a computer program in the computer by monitoring memory allocations and deallocations, such commands being of the type that allocate or deallocate memory for a variable, each variable having a name location, a name, and a size, comprising:
   a. means for generating a logical table in the computer structured to store at least one entry comprising values for a variable name location, variable name, and variable size;
   b. means for storing entries in the logical table for allocated variables;
   c. means for deleting corresponding entries in the logical table for deallocated variables;
   d. means for examining in the computer, upon termination of a selected group of commands of the computer program, the logical table for any undeleted entries of allocated variables and for storing the variable name location for such undeleted entries as hanging names for future recall;
   e. means for entering selected ones of the hanging names into the logical table before a subsequent execution of the program;
   f. means for comparing in the computer the variable name location of the variable to the hanging names in the logical table during subsequent execution of the program and upon execution of a command allocating a variable;
   g. means for generating an error indication to the computer if the variable name location of the variable matches any of the hanging names in the logical table.

7. An error control system, used in conjunction with a digital computer, of automatically detecting operational errors in execution of commands of a second computer program in the computer by monitoring memory allocations, such commands being of the type that allocate memory for a variable, each variable having a name location, a name, and a size, the system comprising a computer program storage medium having a computer program stored thereon for execution by said digital computer, the program comprising:
   a. means for generating a logical table in the computer structured to store at least one entry comprising values for a variable name location, variable name, and variable size;
   b. means for comparing in the computer, during execution of a command allocating a variable, the variable name location, variable name, and variable size of the variable to a set of allocation test conditions, including comparison of the variable name location of the variable to the variable name location value of the at least one entry of the logical table;
   c. means for generating an error indication to the computer if the variable fails any one of the set of allocation test conditions, and for otherwise storing the variable name location, variable name, and variable size of the variable as an entry in the logical table, and allocating the variable in the computer.

8. An error control system, used in conjunction with a digital computer, of automatically detecting operational errors in execution of commands of a second computer program in the computer by monitoring memory deallocations, such commands being of the type that deallocate memory for a variable, each variable having a name location, a name, and a size, the system comprising a computer program storage medium having a computer program stored thereon for execution by said digital computer, the program comprising:
   a. means for generating a logical table in the computer structured to store at least one entry comprising values for a variable name location, variable name, and variable size;
   b. means for storing entries in the logical table for allocated variables;
   c. means for comparing in the computer, during execution of a command deallocating a variable, the variable name location and variable name of the variable to a set of deallocation test conditions, including comparison of the variable name location of the variable to the variable name location value of the at least one entry of the logical table;
   d. means for generating an error indication to the computer if the variable fails any one of the set of deallocation test conditions, and for otherwise deleting the entry in the logical table having a variable name location matching the variable name location of the variable, and deallocating the variable in the computer.

9. An error control system, used in conjunction with a digital computer, of automatically detecting operational errors in execution of commands of a second computer program in the computer by monitoring memory allocation and deallocations, such commands being of the type that deallocate memory for a variable, each variable having a name location, a name, and a size, the system comprising a computer program storage medium having a computer program stored thereon for execution by said digital computer, the program comprising:
   a. means for generating a logical table in the computer structured to store at least one entry comprising values for a variable name location, variable name, and variable size;
   b. means for storing entries in the logical table for allocated variables;
   c. means for deleting corresponding entries in the logical table for deallocated variables;
   d. means for examining in the computer, upon termination of a selected group of commands of the second computer program, the logical table for any undeleted entries of allocated variables and for storing the variable name location for such undeleted entries as hanging names for future recall;
   e. means for entering selected ones of the hanging names into the logical table before a subsequent execution of the second computer program;
   f. means for comparing in the computer the variable name location of the variable to the hanging names in the logical table during subsequent execution of the second computer program and upon execution of a command allocating a variable;
   g. means for generating an error indication to the computer if the variable name location of the variable matches any of the hanging names in the logical table.

* * * * *